United States Patent
Hancock et al.

(10) Patent No.: US 6,764,037 B2
(45) Date of Patent: Jul. 20, 2004

(54) HOUSING FOR INFORMATION STORAGE MEDIUM AND METHOD USING SAME

(75) Inventors: Reed Alan Hancock, Tucson, AZ (US); James Alfred Jackmond, Tucson, AZ (US); Joseph Chase Ramirez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 10/107,087

(22) Filed: Mar. 25, 2002

(65) Prior Publication Data

US 2003/0178519 A1 Sep. 25, 2003

(51) Int. Cl.⁷ .......................................... G11B 23/107
(52) U.S. Cl. ..................................... 242/348; 360/132
(58) Field of Search ............................ 242/348, 347.1; 360/83, 85, 93, 132, 133; 369/291

(56) References Cited

U.S. PATENT DOCUMENTS

| | | | |
|---|---|---|---|
| 3,857,531 A | | 12/1974 | Jantzen |
| 3,861,611 A | * | 1/1975 | Esashi et al. ............ 242/326.2 |
| 4,320,430 A | * | 3/1982 | Vogt ........................... 360/133 |
| 4,412,260 A | | 10/1983 | Stricklin et al. .............. 360/97 |
| 4,459,628 A | * | 7/1984 | Barton ........................ 360/133 |
| 4,488,191 A | * | 12/1984 | Oishi et al. ................. 360/133 |
| 4,646,192 A | * | 2/1987 | Droux et al. ............... 360/133 |
| 4,864,452 A | * | 9/1989 | Thompson et al. ......... 360/133 |
| 5,197,055 A | | 3/1993 | Hartung et al. .............. 369/34 |
| 5,479,581 A | | 12/1995 | Kleinschnitz ................ 395/82 |
| 5,481,420 A | | 1/1996 | Cardona et al. ......... 360/99.06 |
| 5,691,860 A | | 11/1997 | Hoppe ..................... 360/97.02 |
| 5,868,338 A | * | 2/1999 | Martin et al. ............... 242/348 |
| 5,914,919 A | | 6/1999 | Fosler et al. ................. 369/34 |
| 5,969,915 A | * | 10/1999 | Patterson .................... 360/133 |
| 5,970,030 A | | 10/1999 | Dimitri et al. ............... 369/36 |
| 6,097,574 A | * | 8/2000 | Morita et al. ............... 360/132 |

FOREIGN PATENT DOCUMENTS

| | | | |
|---|---|---|---|
| EP | 0062171 | 3/1982 | |
| EP | 0924702 | 6/1999 | |
| JP | 10-254634 | 9/1998 | ............ G06F/3/06 |
| JP | 11194964 | 7/1999 | |
| JP | 11-212736 | 8/1999 | ............ G06F/3/06 |
| JP | 11297034 | 10/1999 | |
| WO | 98/49684 | 11/1998 | |
| WO | 99/56282 | 11/1999 | |

\* cited by examiner

*Primary Examiner*—William A. Rivera
(74) *Attorney, Agent, or Firm*—Dale F. Regelman

(57) ABSTRACT

A seven-sided housing for an information storage medium, where one of those seven sides is moveable in two planes to allow access to an information storage medium disposed therein. A portable data storage cartridge which includes an information storage medium disposed in Applicants' housing. A method to read information from, and/or write information to, the information storage medium disposed within Applicants' portable data storage cartridge.

An information storage and retrieval system which includes one or more of Applicants' portable data storage cartridges. A method to read information from, and/or write information to, an information storage medium disposed in Applicants' data storage cartridge. An information storage and retrieval system which includes a computer useable medium having computer readable program code disposed therein for writing information to and/or retrieving information from, an information storage medium disposed within Applicants' portable data storage cartridge.

34 Claims, 16 Drawing Sheets

FIG. 1A
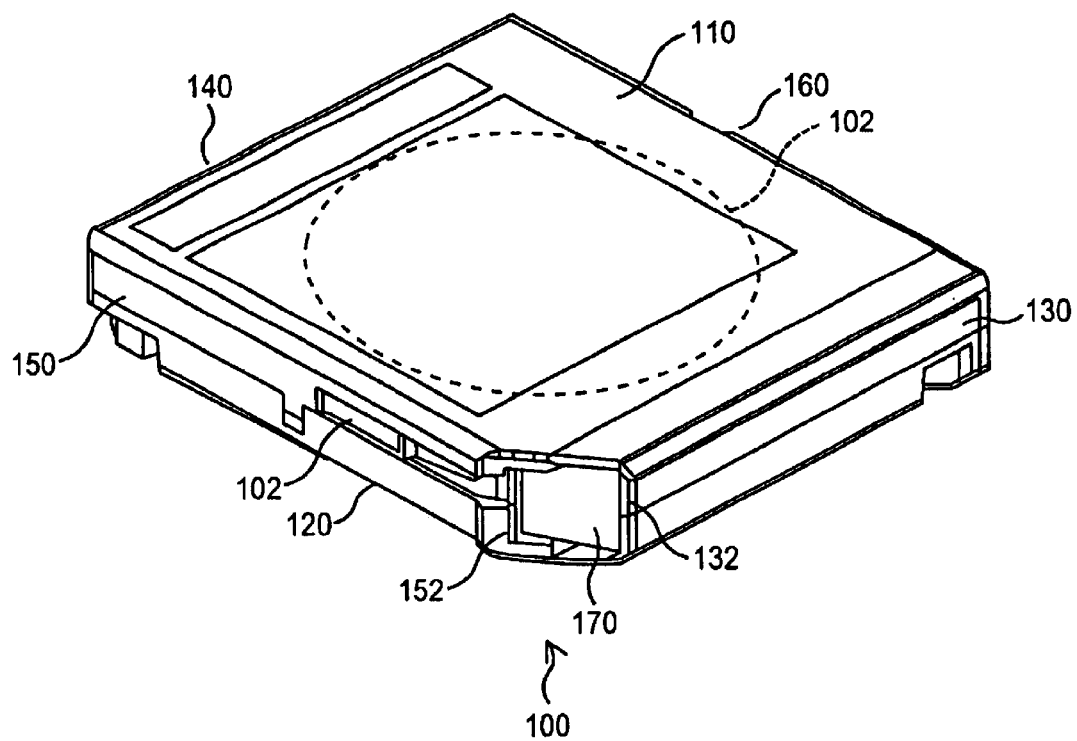
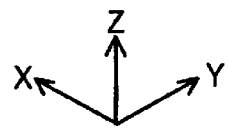

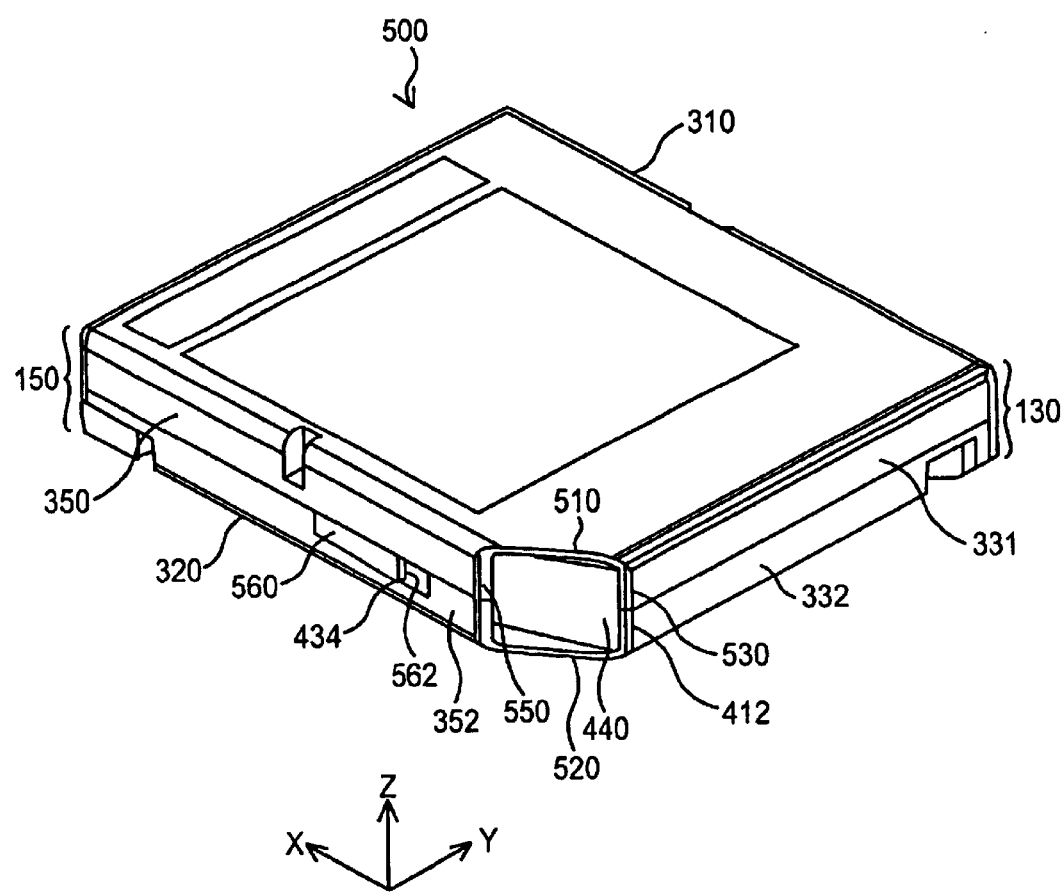

US 6,764,037 B2

HOUSING FOR INFORMATION STORAGE MEDIUM AND METHOD USING SAME

FIELD OF THE INVENTION

This invention relates to the field of housings for moveable information storage media. In certain embodiments, the invention relates to a tape storage cartridge.

BACKGROUND OF THE INVENTION

Tape media, such a magnetic tape, is a common medium for the storage of data to be utilized by a computer. Magnetic tape has found widespread use as a data storage medium because it provides a relatively inexpensive solution for storing large amounts of data. Magnetic tape is typically stored on cartridges of which there are a variety of different types and sizes. One reason for the variety of cartridge types is the variety of different tape drives in which the cartridges are used.

Tape cartridges are comprised essentially of a cartridge shell which houses a rotatably mounted reel. Magnetic tape is wound around the hub of the reel. Reel flanges are used to contain the magnetic tape as the magnetic tape is wound on the hub. A fully loaded tape cartridge has magnetic tape wound around the hub such that the multiple layers of tape form a stack of magnetic tape extending out to near the end of the reel flanges. The tape cartridge is inserted into a tape drive mechanism which automatically threads the magnetic tape from the tape cartridge through the tape guide mechanism of the tape drive assembly. The tape is then available to the tape drive mechanism for the reading and writing of data.

Tape cartridges containing, for example, magnetic tape, are often used in automated data storage libraries. Such automated media storage libraries are known for providing cost effective access to large quantities of stored media. One (or more) accessor typically accesses the tape cartridges from a plurality of storage slots and delivers the accessed tape cartridge to a data storage drive for reading and/or writing data on the accessed tape cartridge. Suitable electronics both operate the accessor and operate the data storage drives to transmit and/or receive data from an attached on-line host computer system.

In a conventional automated media storage library, the storage slots are arranged in a planar orthogonal arrangement forming a "wall" of storage slots for holding data storage media. The plane may be a flat plane, or may be a cylindrical surface. To double the storage capacity, two "walls" of storage slots may be provided on either side of the accessor.

SUMMARY OF THE INVENTION

Applicants' invention includes a seven-sided housing for an information storage medium, where that housing includes a first side and a second side have a facing relationship in a first plane, a third side and a fourth side have a facing relationship in a second plane, where the second plane is orthogonal to the first plane, a fifth side and a sixth side have a facing relationship in a third plane, where the third plane is orthogonal to the first plane and to the second plane, and a seventh side moveably disposed in the first plane and in the second plane. A first force in a first direction holds the moveable seventh side in a first, i.e. closed, position. Exerting a second force on the moveable seventh side in a second direction opposed to the first direction will cause the seventh side to slide from the first/closed position to a second, open, position to allow access to the information storage medium disposed within Applicants' housing.

Applicants' invention includes a method to access an information storage medium disposed internally within Applicants' housing. Applicants' method includes the step of moving the seventh side in the first and second planes, from the first/closed position to the second/open position.

Applicants' invention includes a data storage and retrieval system which includes one or more portable data storage cartridges, where at least one of those portable data storage cartridges includes an information storage medium disposed within Applicants' housing. Applicants' invention includes a data storage and retrieval system which includes a computer useable medium having computer readable program code disposed therein for writing information to and/or retrieving information from, an information storage medium disposed within Applicants' portable data storage cartridge.

BRIEF DESCRIPTION OF THE DRAWINGS

The invention will be better understood from a reading of the following detailed description taken in conjunction with the drawings in which like reference designators are used to designate like elements, and in which:

FIG. 1A shows a first perspective view of Applicants' housing;

FIG. 5D shows a perspective view of Applicants' housing where the moveable assembly of FIG. 4 is disposed in a first, i.e. closed, position;

DETAILED DESCRIPTION OF THE PREFERRED EMBODIMENTS

Referring to the illustrations, like numerals correspond to like parts depicted in the figures. The invention will be described as embodied in a portable data storage cartridge disposed in an information storage and retrieval system. The following description of Applicant's apparatus and method is not meant, however, to limit Applicant's invention to tape cartridges or to data processing applications, as the invention herein can be applied to information storage in general.

Figure 1B:
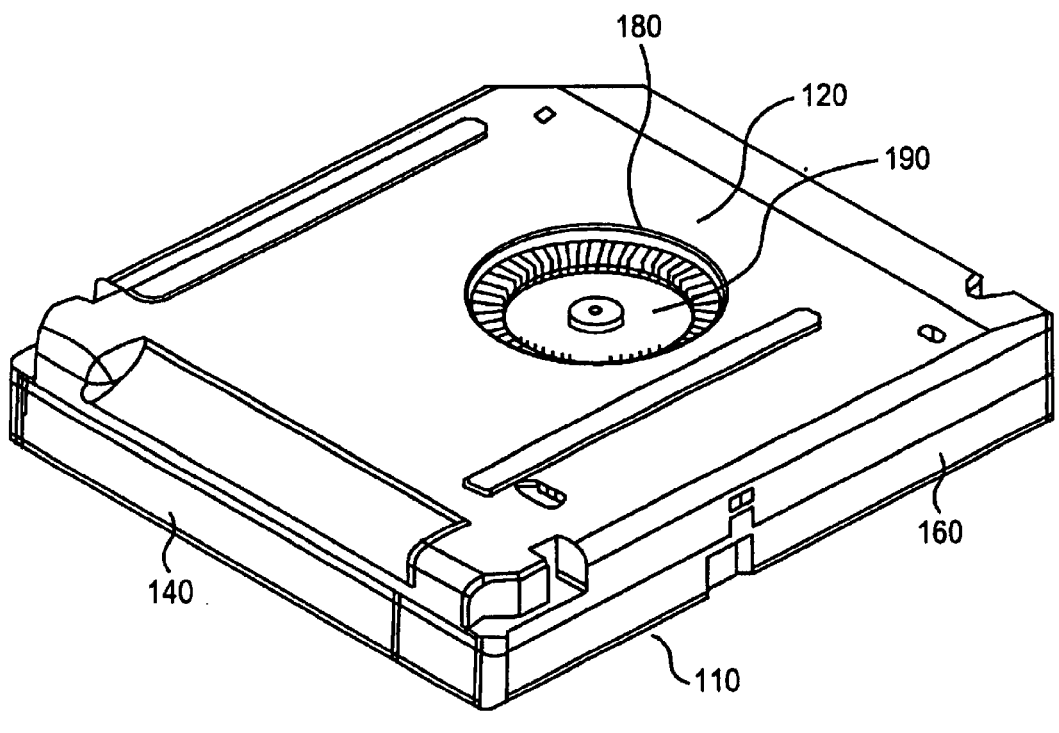
FIG. 1B shows a second perspective view of Applicants' housing.

FIGS. 1A and 1B show embodiment 100 of Applicants' housing. Information storage medium 102 is internally disposed within housing 100. Information storage medium 102 includes, for example, a magnetic information storage medium, an optical information storage medium, an electronic information storage medium, and the like. By electronic storage media, Applicants mean a device such as a PROM, EPROM, EEPROM, Flash PROM, and the like. In certain embodiments, housing 100/information storage medium 102 in combination comprise a portable data storage cartridge. For example, in certain embodiments housing 100 encases reel 210 (FIG. 2) around which is wound magnetic tape.

There are various features not shown on housing 100, such as locating notches, write-inhibiting switches, and the like. Housing 100 is only exemplary, and certain housing embodiments of present invention are applicable to any configuration of housing 100, and are useful for enclosing various information storage media.

Housing 100 comprises a seven-sided enclosure, which includes side 110 and opposing side 120, side 130 and opposing side 140, side 150 and opposing side 160, and seventh side 170. Referring to the coordinate system recited in FIG. 1, sides 150 and 160 are disposed in the XZ plane, i.e. a first plane. Sides 130 and 140 are disposed in the YZ plane, i.e. a second plane. Sides 110 and 120 are disposed in the XY plane, i.e. a third plane. Side 170 is moveably disposed in both the XZ and the YZ planes, i.e. in the second plane and third plane. As those skilled in the art will appreciate, the first plane, second plane, and third plane, are orthogonal to one another.

Figure 2:
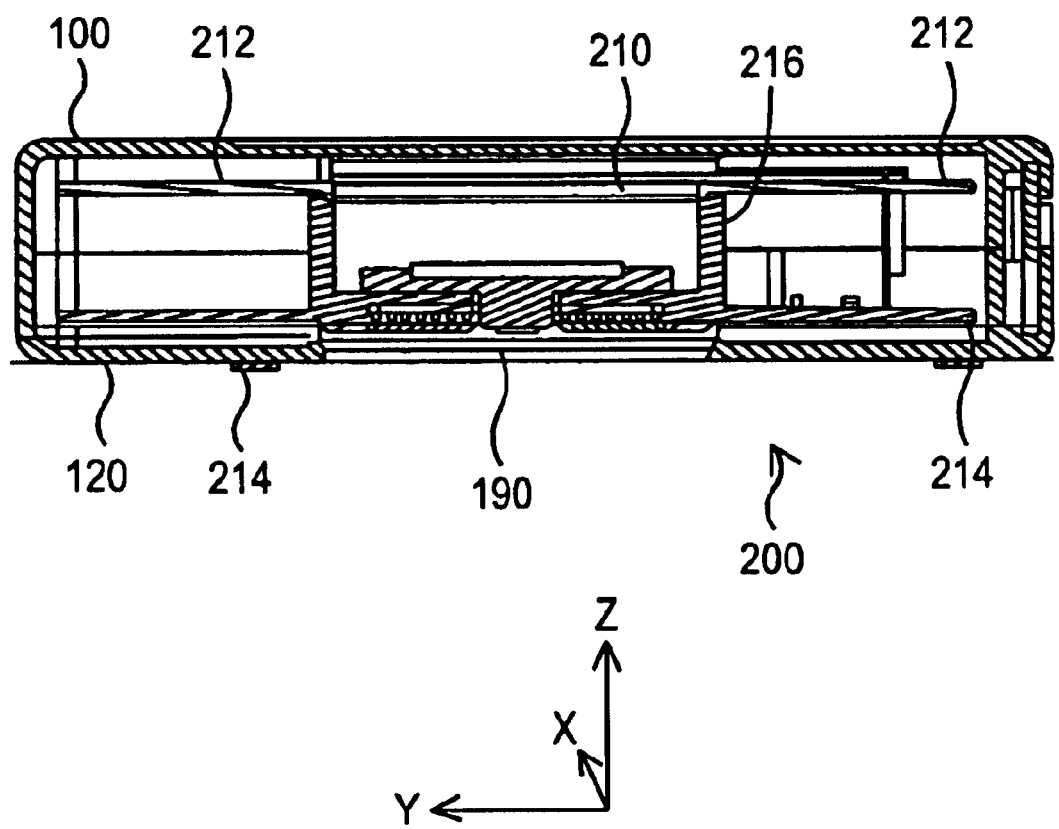
FIG. 2 shows a cross-sectional view of Applicants' housing.

Referring to FIG. 1B, side 120 includes aperture 180. Rotatable assembly 190 is internally disposed within housing 100 adjacent aperture 180. FIG. 2 shows a cross-section view of embodiment 200 of Applicants' invention. Apparatus 200 comprises a tape cartridge which includes housing 100 (FIG. 1), rotatable assembly 190 (FIG. 1), and tape reel 210. Tape reel 210 comprises first flange 212, second flange 214, and hub 216. Flanges 212 and 214 connect to, and extend radially outward from, hub 216 forming a channel between them in which tape 250 (not shown in FIG. 2) is contained as that tape is wound around hub 216.

As those skilled in the art will appreciate, when tape cartridge 200 is removeably disposed in, i.e. mounted in, a data storage device, drive motor mechanism 240 (not shown in FIG. 2) of the data storage device extends through aperture 180 to releaseably engage rotatable assembly 190. In response to signals from a tape drive controller, drive motor mechanism 240 rotates reel 210. The operation of the drive motor mechanism is coordinated with the remainder of the tape drive mechanism to draw tape 250 from tape cartridge 200 for use in the tape drive mechanism to, for example, read and/or write data thereon. There must be a certain amount of clearance between reel 210 and housing 100. This is necessary to allow reel 210 to move slightly with respect to housing 100 to allow proper engagement between reel 210 and drive motor mechanism 240.

Figure 3:
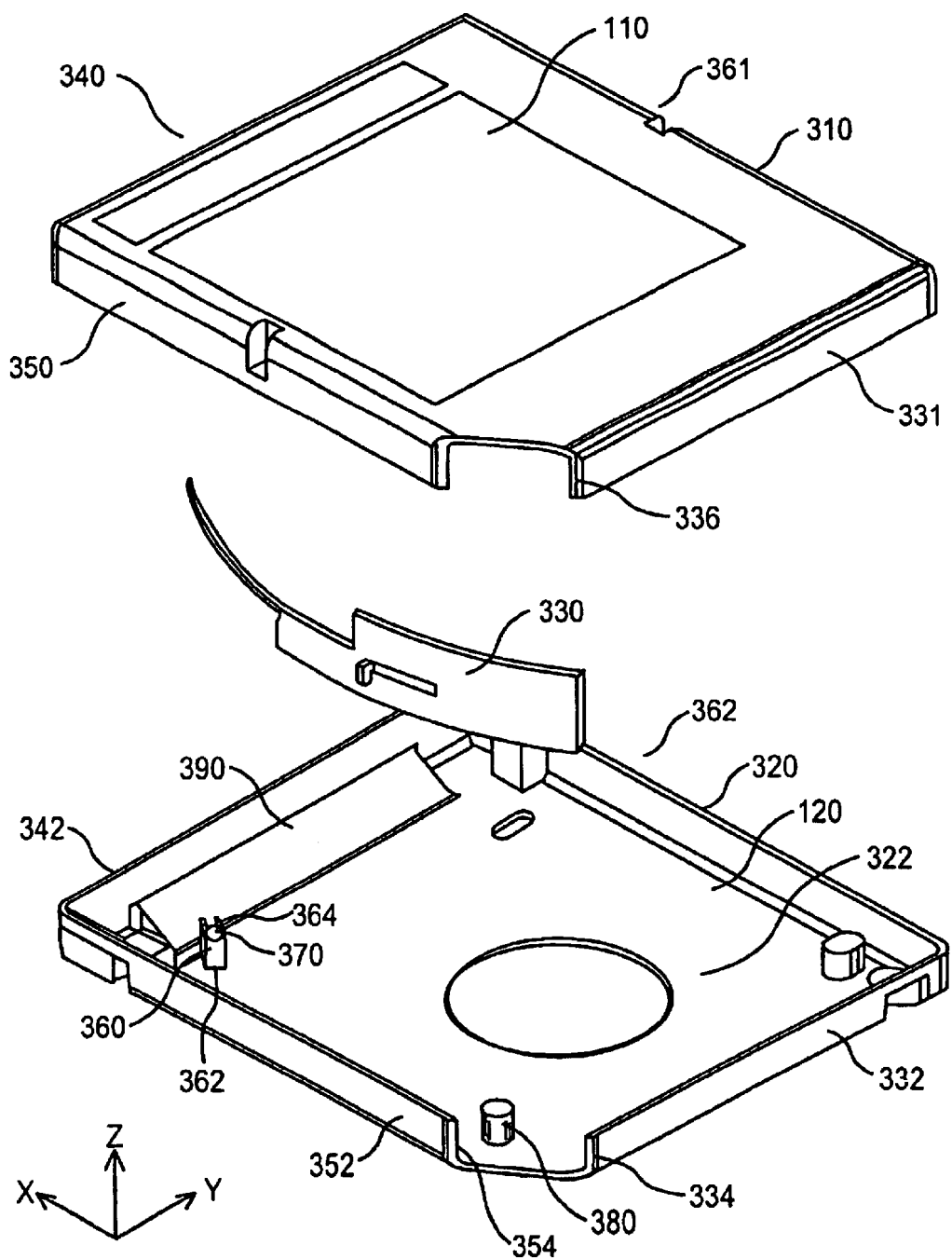
FIG. 3 shows a perspective view of the assemblies used to form Applicants' housing.

Referring to FIG. 3, in certain embodiments housing 100 comprises first assembly 310, second assembly 320, and moveable assembly 330. First assembly 310 comprises first side 110 (FIG. 1) and sides 331, 340, 350, and 361 which attach to side 110 and extend outwardly therefrom. First assembly is formed from any rigid material, including plastic, metal, and combinations thereof. First assembly 310 can be molded as an integral body, or can be formed from sides 110, 330, 340, 350, and 361, which have been attached as shown in FIG. 3 using conventional techniques, including, for example, adhesive bonding, plastic welding, spot welding, welding, use of mechanical fasteners such as screws, nuts, bolts, and the like.

Second assembly 320 comprises second side 120 (FIG. 1), and sides 332, 342, 352, and 362, which attach to side 120 and extend outwardly therefrom. Second assembly 320 is formed from any rigid material, including plastic, metal, and combinations thereof. Second assembly 320 can be molded as an integral body, or can be formed from sides 120, 332, 342, 352, and 362, which have been attached as shown in FIG. 3 using conventional techniques, including, for example, adhesive bonding, plastic welding, spot welding, welding, use of mechanical fasteners such as screws, nuts, bolts, and the like.

Side 120 includes interior surface 322. Member 380 is attached to surface 322, adjacent end 354 of side 352, and extends outwardly from surface 322. In certain embodiments, member 380 has a cylindrical shape, i.e. a circular cross-section. In certain embodiments, member 380 has a substantially square cross-section. By "substantially" square cross-section, Applicants' mean either a square cross-section, or a square cross-sectional shape which includes rounded corners. In certain embodiments, member 380 has a substantially rectangular cross-section. In certain embodiments, member 380 has an elliptical cross-section. In certain embodiments, member 380 has a substantially pentagonal cross-section. In certain embodiments, member 380 has a substantially hexagonal cross-section.

Member 360 is disposed on surface 322 and extends outwardly therefrom. In certain embodiments, member 360 has a cylindrical shape, i.e. a circular cross-section. In certain embodiments, member 360 has a substantially square cross-section. In certain embodiments, member 360 has a substantially rectangular cross-section. In certain embodiments, member 360 has an elliptical cross-section. In certain embodiments, member 360 has a substantially pentagonal cross-section. In certain embodiments, member 380 has a substantially hexagonal cross-section.

First end 362 of member 360 is attached to surface 322, adjacent side 352. Second end, i.e. the distal end, 364 of member 360 extends outwardly from surface 322. In certain embodiments, second end 364 includes aperture/groove 370. In certain embodiments, member 360 includes aperture 370 disposed adjacent second end 364. In certain embodiments, second end 364 is formed to include groove 370 on the distal end.

Figure 4:
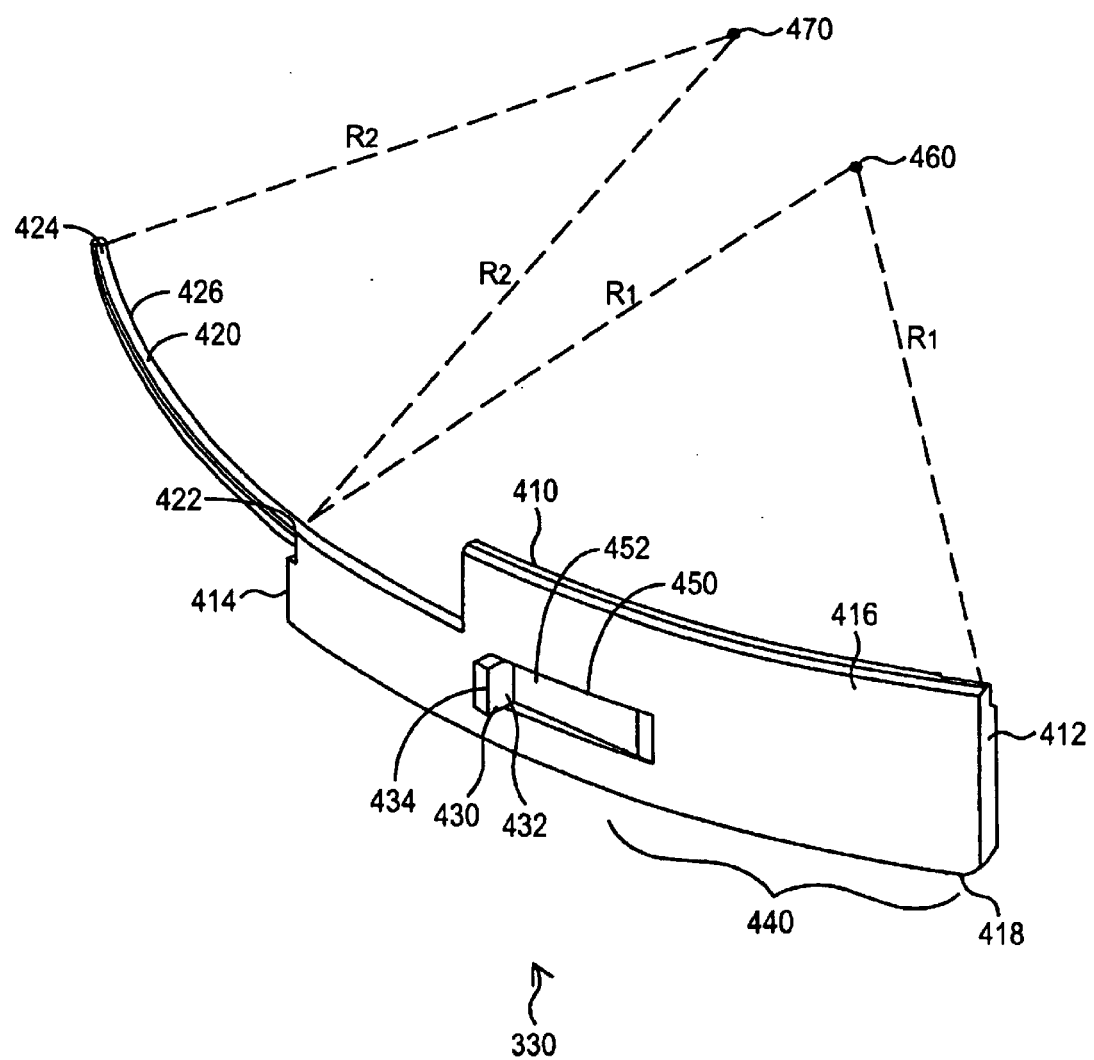
FIG. 4 shows a perspective view of a curved, moveable assembly disposed within Applicants' housing.

Referring now to FIG. 4, moveable assembly 330 comprises member 410, member 420, and member 430. In certain embodiments, moveable assembly 330 is integrally formed. In certain embodiments, moveable assembly 330 is assembled by separately forming member 410, member 420, and member 430, and subsequently attaching those members to produce moveable assembly 330. Member 410 comprises first end 412, second end 414, first surface 416, and edge 418 connecting first end 412 and second end 414. In the embodiment shown in FIG. 4, member 410 has a "curved" configuration, such that edge 418 defines an arc comprising a portion of a circle having radius $R_1$ from a centerpoint 460.

Member 420 comprises first end 422, second end 424, and edge 426 connecting first end 422 and second end 424. In the embodiment shown in FIG. 4, member 420 has a "curved" configuration, such that edge 426 defines an arc comprising a portion of a circle having radius $R_2$ from a centerpoint 470. In certain embodiments, radius $R_1$ and radius $R_2$ have equal length, i.e. centerpoints 460 and 470 are identical. In other embodiments, radius $R_1$ and radius $R_2$ differ in length. End 422 of member 420 is attached to end 414 of member 410, with end 424 extending outwardly from member 410.

Member 430 comprises first end 432 and second end 434. First end 432 is disposed on surface 416 with second end 434 extending outwardly from surface 416. In certain embodiments, surface 416 includes groove 450. In certain embodiments, first end 432 of member 430 is disposed to floor portion 452 of groove 450.

Figure 5A:
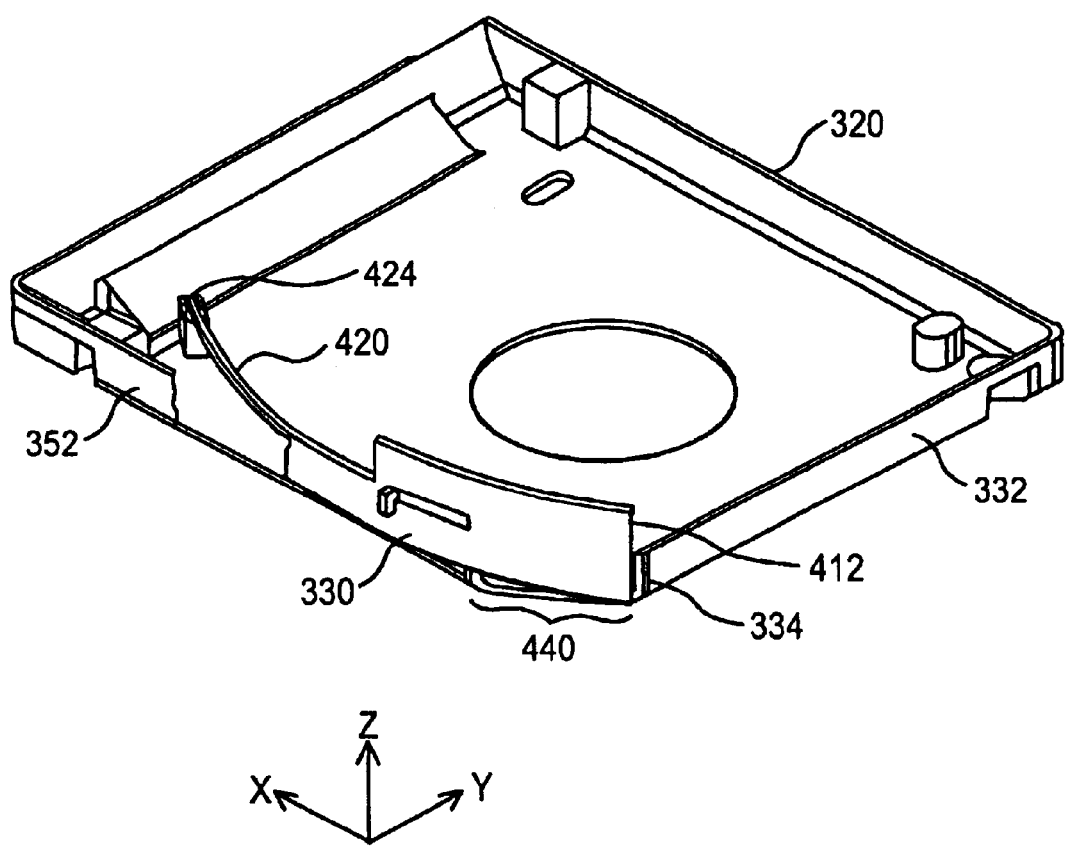
FIG. 5A shows a perspective view of a first embodiment of the moveable assembly of FIG. 4 disposed in a first position within a subassembly of Applicants' housing.
Figure 5B:
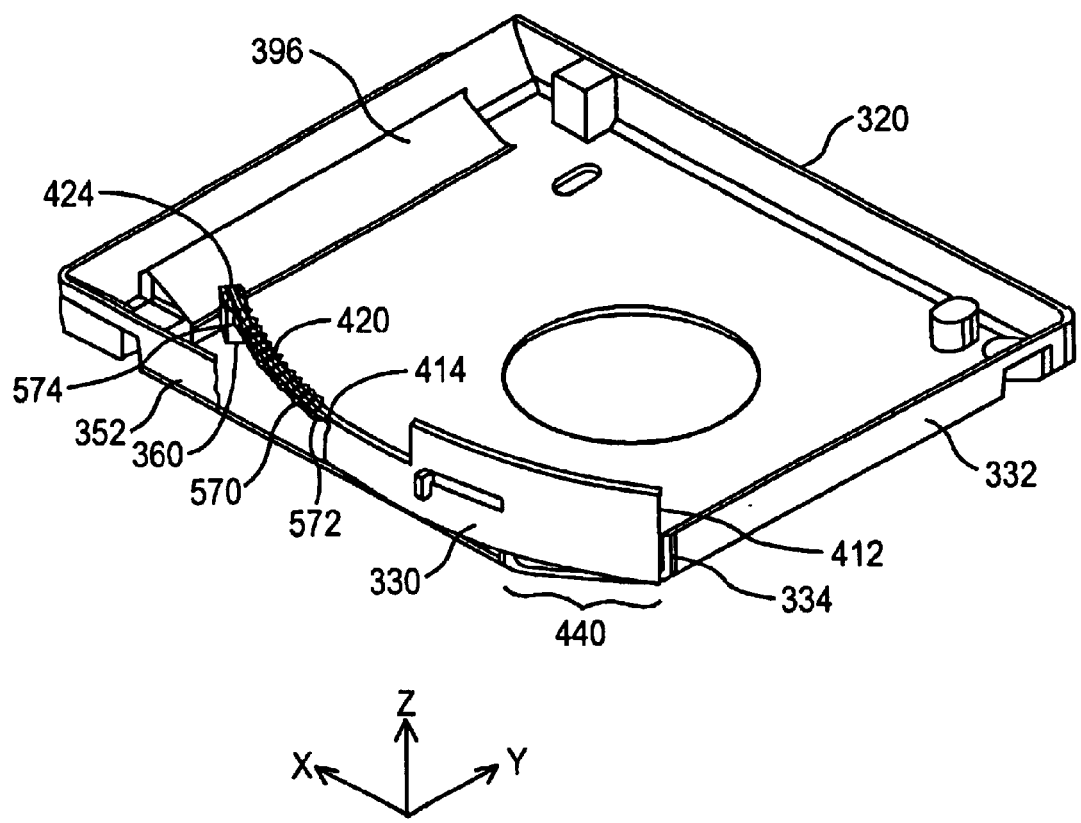
FIG. 5B shows a perspective view of a second embodiment of the moveable assembly of FIG. 4 disposed in a first position within a subassembly of Applicants' housing.
Figure 5C:
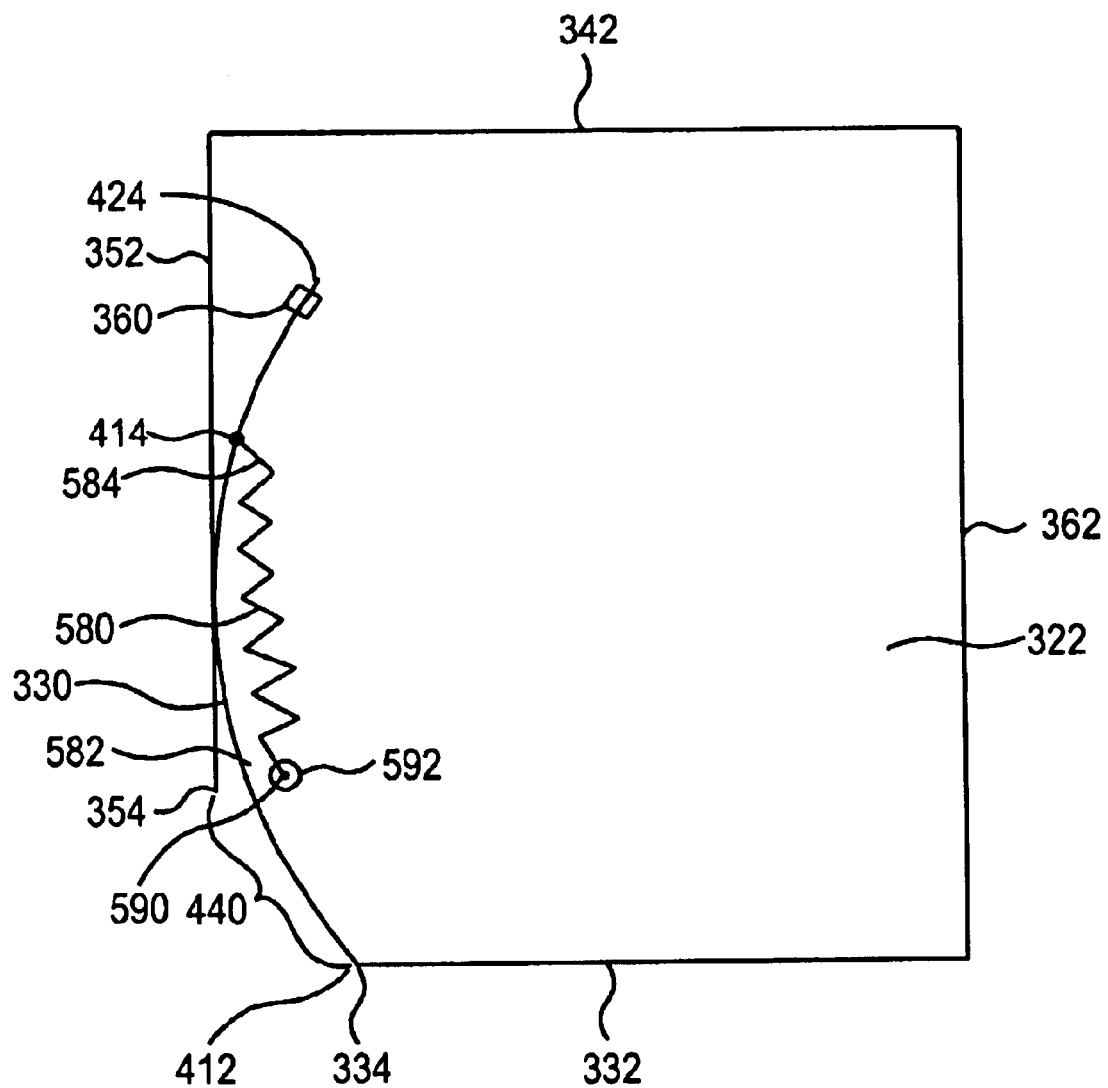
FIG. 5C shows a top view of a third embodiment of the moveable assembly of FIG. 4 disposed in a first position within a subassembly of Applicants' housing.

FIGS. 5A, 5B, and 5C, show moveable assembly 330 slidingly disposed in assembly 320 in a first position. A portion of side 352 has been removed from FIGS. 5A and 5B to show the positioning of assembly 330. In the embodiment shown in FIG. 5A, assembly 330 is in a first position wherein end 412 (FIG. 4) of member 410 (FIG. 4) is disposed adjacent end 334 (FIG. 3) of side 332. In this first position, member 410 (FIG. 4) is disposed between member 380 (FIG. 3) and side 352. In this first position, distal end 424 (FIG. 4) of member 420 (FIG. 4) is slidingly disposed through aperture/groove 370 (FIG. 3). With assembly 330 is in this first position, portion 440 of member 410 comprises side 170 shown in FIG. 1.

Referring to FIG. 5B, in certain embodiments Applicants' housing includes spring 570. Spring 570 has a first end 572 and a second end 574. In these embodiments, spring 570 is disposed around member 420 with first end 572 disposed adjacent end 414 (FIG. 4) of member 410 (FIG. 4), and with second end 574 disposed adjacent member 360 (FIG. 3). With assembly 330 disposed in the first position shown in FIG. 5B, spring 570 is disposed in a first orientation having a first distance $D_1$ between first end 572 and second end 574. When spring 570 is disposed in this first orientation, spring 570 exerts a first force $F_1$ on assembly 330 along the $-X$ direction. In the absence of an opposing force, first force $F_1$ keeps assembly 330 in the first position shown in FIG. 5B.

Referring to FIG. 5C, in certain embodiments Applicants' housing includes spring 580. Spring 580 has a first end 582 and a second end 584. In certain embodiments, first end 582 is attached to floor 322 at attachment point 590, and second end 584 is attached to member 410 at end 414. In certain embodiments, first end 582 is attached to spring attachment member 592. Spring attachment member 592 is internally disposed within housing 500 (FIG. 5D) with one end attached to the interior surface of side 110 (FIGS. 1A, 1B) and the other end attached to surface 322 at attachment point 590. With moveable assembly 330 disposed in the first position shown in FIG. 5C, spring 580 is disposed in a first orientation having a first distance $D_3$ between first end 582 and second end 584. When spring 580 is disposed in this first orientation, spring 580 exerts a first force $F_1$ on assembly 330 along the $-X$ direction. In the absence of an opposing force, first force $F_1$ keeps assembly 330 in the first position shown in FIG. 5C.

In certain embodiments, the afore-described first force $F_1$ results from flexion of distal end 424 of member 420. In these embodiments, member 420 is formed from a material having a flexural modulus, determined using ASTM method D790, of about 0.5 GPa or greater. Referring again to FIG. 5A, in certain embodiments which do not include either spring 570 or 580, distal end 424 is slidingly disposed against triangular member 390. When assembly 330 is in the first position described above, distal end 424 is bent inwardly, i.e. member 420 is flexed in the $-X$ direction, decreasing the distance between end 424 and centerpoint 470 (FIG. 4) to a third radius $R_3$ which has a smaller length than does radius $R_2$ (FIG. 4). This flexion of member 420 exerts the afore-described first force $F_1$ on assembly 330 in the $-X$ direction.

In certain embodiments, first force $F_1$ is produced by a combination of spring 570, and/or spring 580, and/or flexion of member 420. These embodiments include a redundant source of the first force $F_1$.

FIG. 5D shows housing 500 formed from component 310, component 320, and assembly 330, wherein assembly 330 is in the first position described above such that portion 440 corresponds to side 170 shown in FIG. 1. When components 310 and 320 are joined, sides 331 and 332 in combination correspond to side 130 (FIG. 1) of housing 100 (FIG. 1), sides 340 and 342 in combination correspond to side 140 (FIG. 1) of housing 100 (FIG. 1), sides 350 and 352 in combination correspond to side 150 (FIG. 1) of housing 100 (FIG. 1), and sides 361 and 362 in combination correspond to 160 (FIG. 1) of housing 100 (FIG. 1). Edge 530 comprises edges 334 (FIG. 3) and 336 (FIG. 3).

With moveable assembly 330 (FIGS. 3, 4, 5A, 5B, 6A, 6B) in the first position, end 412 (FIGS. 4, 5A, 5B, 5C, 5D, 6A, 6B, 6C, 6D) of member 410 (FIG. 4) is disposed adjacent edge 530. In this first position, portion 440 (FIGS. 4, 5A, 5B, 5C, 5D) of slideable assembly 330 tightly abuts side 110, side 120, side 150, and edge 530, such that housing 500 comprises a contiguous enclosure. In embodiment 500 of Applicants' housing, side 150 includes aperture 560. Distal end 434 (FIGS. 4, 5D, 6D) of member 430 (FIG. 4) extends outwardly through aperture 560. When moveable assembly 330 is in the first position described above, distal end 434 is disposed in a first location 562 within aperture 560 as shown in FIG. 5D.

Referring to FIGS. 5A, 5B, 5C, 5D, and 7, when assembly 330 (FIGS. 3, 4, 5A, 5B, 6A, 6B) is disposed in the first position described above, a first force $F_1$ is exerted along the $-X$ direction on assembly thereby urging end 412 (FIGS. 4, 5A, 5B, 5C, 5D, 6A, 6B, 6C, 6D) against edge 530. In certain embodiments, first force $F_1$ is produced by spring 570 (FIG. 5B). In certain embodiments, first force $F_1$ is produced by spring 580 (FIG. 5C). In certain embodiments, first force $F_1$ is produced by the flexion of member 420. In certain embodiments, first force $F_1$ is produced by a combination of spring 570/spring 580/flexion of member 420. In graph 700, position $X_1$ corresponds to the above-described first position wherein end 412 is disposed against edge 530 by first force $F_1$.

Figure 6A:
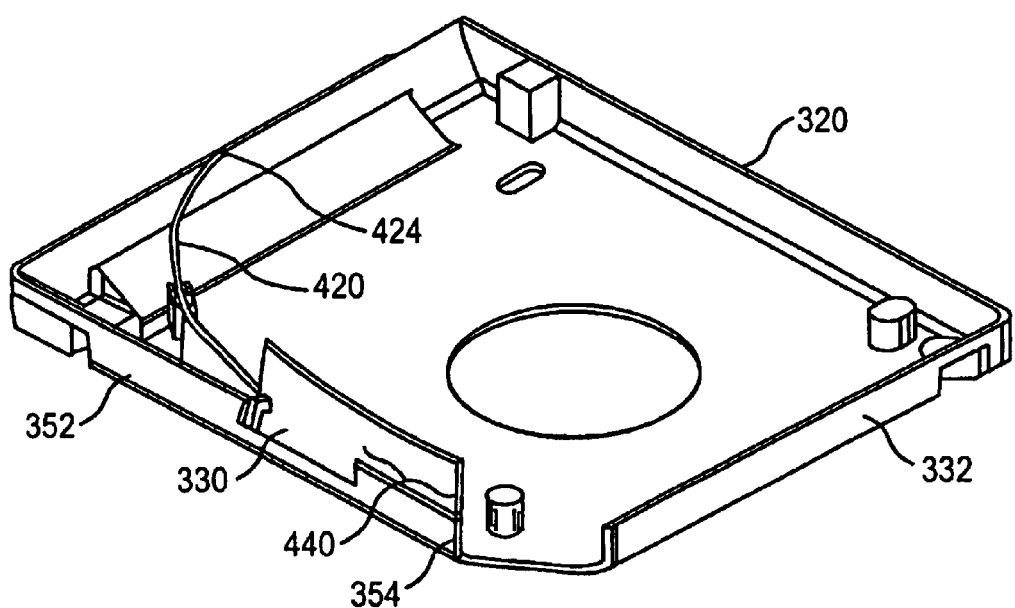
FIG. 6A shows a perspective view of a first embodiment of the moveable assembly of FIG. 4 disposed in a second position within a subassembly of Applicants' housing.
Figure 6B:
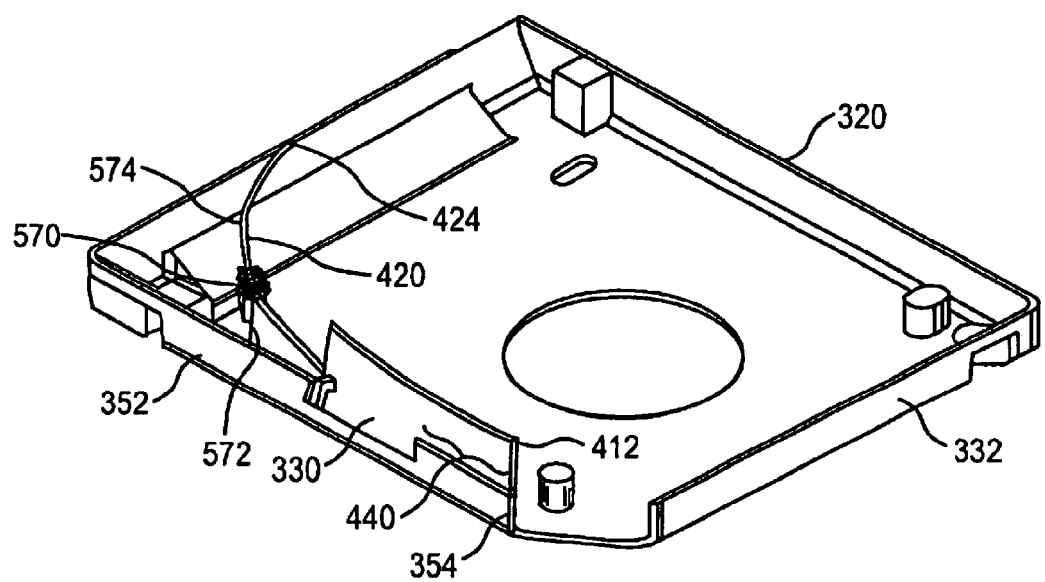
FIG. 6B shows a perspective view of a second embodiment of the moveable assembly of FIG. 4 disposed in a second position within a subassembly of Applicants' housing.
Figure 6C:
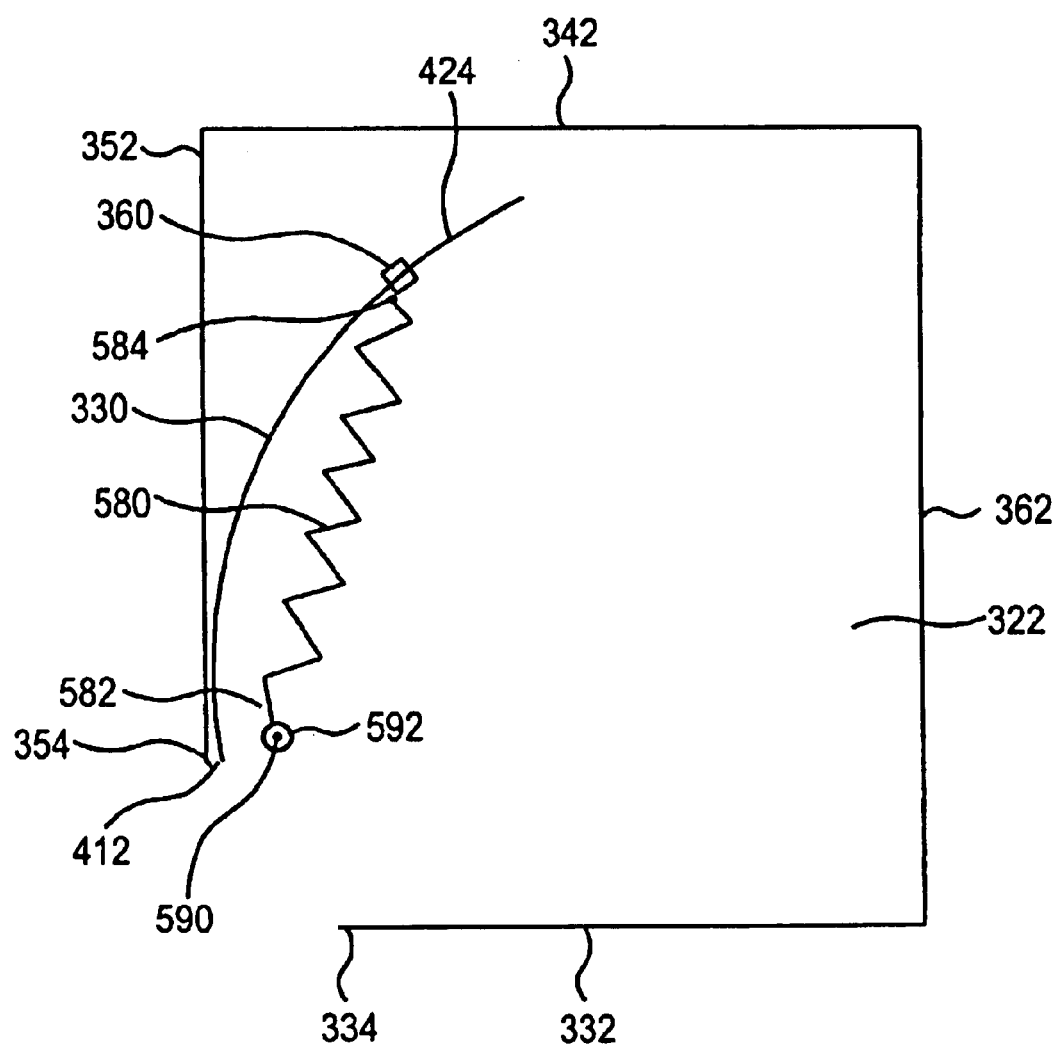
FIG. 6C shows a top view of a third embodiment of the moveable assembly of FIG. 4 disposed in a second position within a subassembly of Applicants' housing.

FIGS. 6A, 6B, and 6C show moveable assembly 330 (FIGS. 3, 4, 5A, 5B, 6A, 6B) slidingly disposed in assembly 320 (FIGS. 3, 5A, 5B, 5C, 6A, 6B, 6C) in a second position. In this second position, end 412 (FIGS. 4, 5A, 5B, 5C, 5D, 6A, 6B, 6C, 6D) of portion 440 (FIGS. 4, 5A, 5B, 6A, 6B) of member 410 (FIG. 4) is disposed adjacent end 354 (FIGS.

3, 6A, 6B) of side 352 (FIGS. 3, 6A, 6B) of assembly 320 (FIGS. 3, 5A, 5B, 5C, 6A, 6B, 6C).

As discussed above, certain embodiments of Applicants' housing include spring 570 (FIG. 5B). Referring to FIG. 6B, when moveable assembly 330 (FIGS. 3, 4, 5A, 5B, 6A, 6B) is moved to the second position, spring 570 is disposed in a second orientation shown in FIG. 6B. In this second orientation, a second distance $D_2$ exists between first end 572 and second end 574. Second distance $D_2$ is less than first distance $D_1$, i.e. spring 570 is further compressed in the second orientation shown in FIG. 6B with respect to the first orientation shown in FIG. 5B. In this second orientation, spring 570 exerts a second force $F_2$ on assembly 330 in the −X direction. Second force $F_2$ is greater than first force $F_1$.

Certain embodiments of Applicants' housing include spring 580 (FIG. 5C). Referring to FIG. 6C, when moveable assembly 330 (FIGS. 3, 4, 5A, 5B, 5C, 6A, 6B, 6C) is moved to the second position, spring 580 is disposed in a second orientation shown in FIG. 6C. In this second orientation, a second distance $D_4$ exists between first end 582 and second end 584. Second distance $D_4$ is greater than first distance $D_3$, i.e. spring 580 is extended in the second orientation shown in FIG. 6C with respect to the first orientation shown in FIG. 5C. In this second orientation, spring 580 exerts a second force $F_2$ on assembly 330 in the −X direction. Second force $F_2$ is greater than first force $F_1$.

Certain embodiments of Applicants' housing do not include spring 570 or spring 580. In these embodiments, second force $F_2$ is produced by increased flexion of member 420. Referring again to FIG. 6A, in these embodiments when assembly 330 is disposed in the second position, distal end 424 (FIG. 4) of member 420 (FIG. 4) is further flexed in the −X direction further decreasing the distance between end 424 and centerpoint 470 (FIG. 4) to a fourth radius $R_4$ which has a lesser length than either radius $R_2$ (FIG. 4) or radius $R_3$. In this embodiment, this further flexion of member 420 produces the afore-described second force $F_2$ on moveable assembly 330 along the −X direction.

Figure 6D:
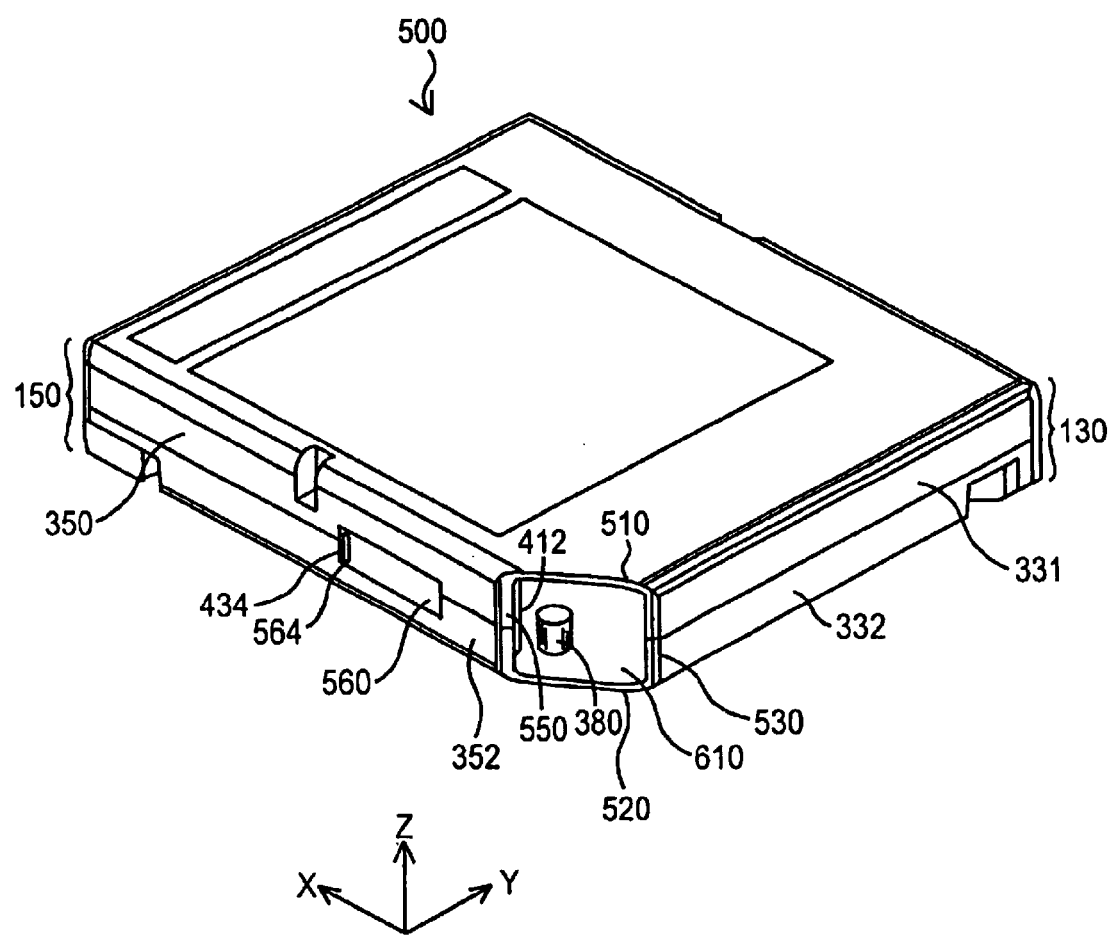
FIG. 6D shows a perspective view of Applicants' housing where the moveable assembly of FIG. 4 is disposed in a second, i.e. open, position.

FIG. 6D shows housing 500 wherein moveable assembly 330 (FIGS. 3, 4, 5A, 5B, 6A, 6B) disposed in the second position such that end 412 (FIGS. 4, 5A, 5B, 5C, 5D, 6A, 6B, 6C, 6D) is disposed adjacent edge 550. With assembly 330 in this second position, housing 500 no longer comprises a contiguous enclosure. Rather, when assembly 330 is moved to the second position, edges 510, 520, 530, and 550, define aperture 610. Access to the information storage medium 102 (FIG. 1) disposed within housing 500 is provided through aperture 610. When moveable assembly 330 is in this second position, distal end 434 of member 430 is disposed at second location 564 in aperture 560. Referring now to FIGS. 5A, 5B, 5C, 5D, 6A, 6B, 6C, 6D, and 7, in the absence of an external force, first force $F_1$ maintains moveable assembly 330 in the first, i.e. closed, position shown in FIGS. 5A, 5B, 5C, and 5D. With moveable assembly 330 in this first position, housing 500 comprises a contiguous, seven-sided enclosure.

When assembly 330 (FIGS. 3, 4, 5A, 5B, 6A, 6B) is slidingly moved from the first, i.e. closed, position to the second, i.e. open, position, end 412 (FIGS. 4, 5A, 5B, 5C, 5D, 6A, 6B, 6C, 6D) moves in both the +X direction, and in the −Y direction. Hence, when a force equal to, or greater than, $F_1$ is exerted on moveable assembly 430 in the +X direction, portion 440 (FIGS. 4, 5A, 5B, 5C, 5D) of assembly 330 is caused to move in both the XZ and the YZ planes.

In the event an external force equal to, or greater than, second force $F_2$ is exerted on moveable assembly 330 (FIGS. 3, 4, 5A, 5B, 6A, 6B) in the +X direction, then moveable assembly 330 slidingly moves from the first position, i.e. closed position, shown in FIGS. 5A, 5B, 5C, and 5D, to the second position, i.e. fully open position, shown in FIGS. 6A, 6B, 6C, and 6D. As those skilled in the art will appreciate, exerting a force equal to, or greater than, second force $F_2$ on distal end 434 (FIGS. 4, 5D, 6D) of member 430 in the +X direction will cause moveable assembly 330 to move in the XZ and YZ planes, and thereby cause moveable assembly 330 to transition from the afore-described first position, i.e. closed, to the afore-described second position, i.e. open.

Figure 7:
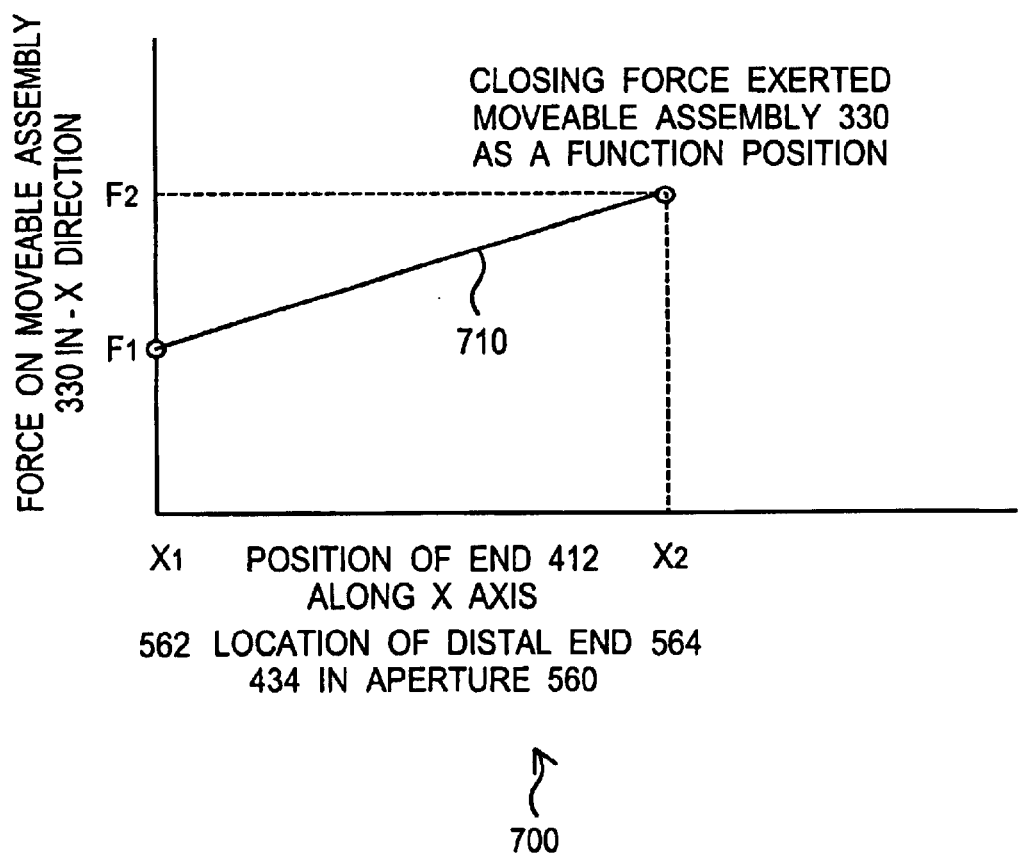
FIG. 7 graphically recites the relationship between the forces imposed on the moveable assembly of FIG. 4 as a function of the position of that moveable assembly.

In graph 700 (FIG. 7), curve 710 represents the closing force exerted on moveable assembly 330 (FIGS. 3, 4, 5A, 5B, 6A, 6B) in the −X direction as a function of: (i) the position of end 412 in the X direction, and (ii) the location of distal end 434 within aperture 560. In FIG. 7, this closing force has a linear relationship to both the position of end 412 and the location of distal end 434. In other embodiments of Applicants' invention, this closing force has a more complex, i.e. quadratic, cubic, and the like, relationship to the position of moveable assembly 330.

Figure 8:
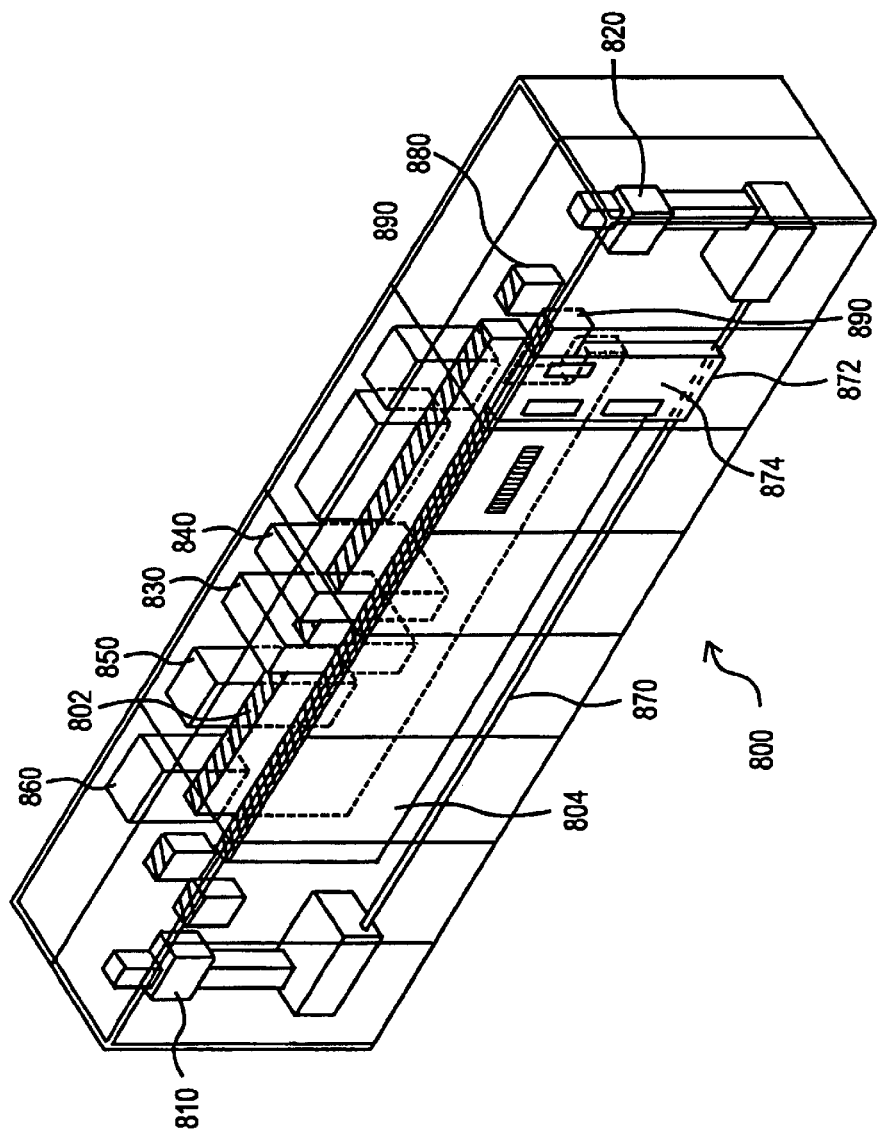
FIG. 8 shows a perspective view of Applicants' automated data storage library.

Referring now to FIG. 8, automated data storage and retrieval system 800 is shown having a first wall of storage slots 802 and a second wall of storage slots 804. One or more of Applicants' portable data storage cartridges are individually stored in one or more of these storage slots.

Applicant's automated data storage and retrieval system includes one or more accessors, such as accessors 810 and 820. An accessor is a robotic device which accesses portable data storage media from first storage wall 802 or second storage wall 804, transports that accessed media to data storage devices 830/840 for reading and/or writing data thereon, and returns the media to a proper storage slot. As shown in FIG. 8, accessors 810 and 820 travel bi-directionally along rail 870 in an aisle disposed between first wall of storage slots 802 and second wall of storage slots 804.

In certain embodiments, device 860 comprises a library controller. In certain of these embodiments, library controller 860 is integral with a computer. In other embodiments, Applicants' data storage and retrieval system utilizes a distributed control network. In these distributed control network embodiments, device 860 may comprise a motion card pack.

Referring again to FIG. 8, operator input station 850 permits a user to communicate with Applicant's automated data storage and retrieval system 800. Power component 880 and power component 890 each comprise one or more power supply units which supply power to the individual components disposed within Applicant's automated data storage and retrieval system. Import/export station 872 includes access door 874 pivotably attached to the side of system 800. Applicants' portable data storage cartridges can be placed in the system, or in the alternative, removed from the system, via station 872/access door 874.

Applicants' data storage and retrieval system and data storage devices 830 and 840 include hardware and/or software such that when Applicants' portable data storage cartridge comprising an information storage medium disposed in Applicants' housing, such as housing 100/500, is disposed in devices 830/840, a force equal to, or greater than, second force $F_2$ is exerted on distal end 434 (FIGS. 4, 5D, 6D) of member 430 (FIG. 4) in a first direction, i.e. in the +X direction shown in FIGS. 5D and 6D, causing moveable assembly 330 (FIGS. 3, 4, 5A, 5B, 5C, 6A, 6B, 6C) to move from the first/closed position shown in FIGS. 5A, 5B, 5C, and 5D to the second/open position shown in FIGS. 6A, 6B, 6C, and 6D, thereby allowing access by the data storage device to the information storage medium disposed within the portable data storage cartridge.

Figure 9:
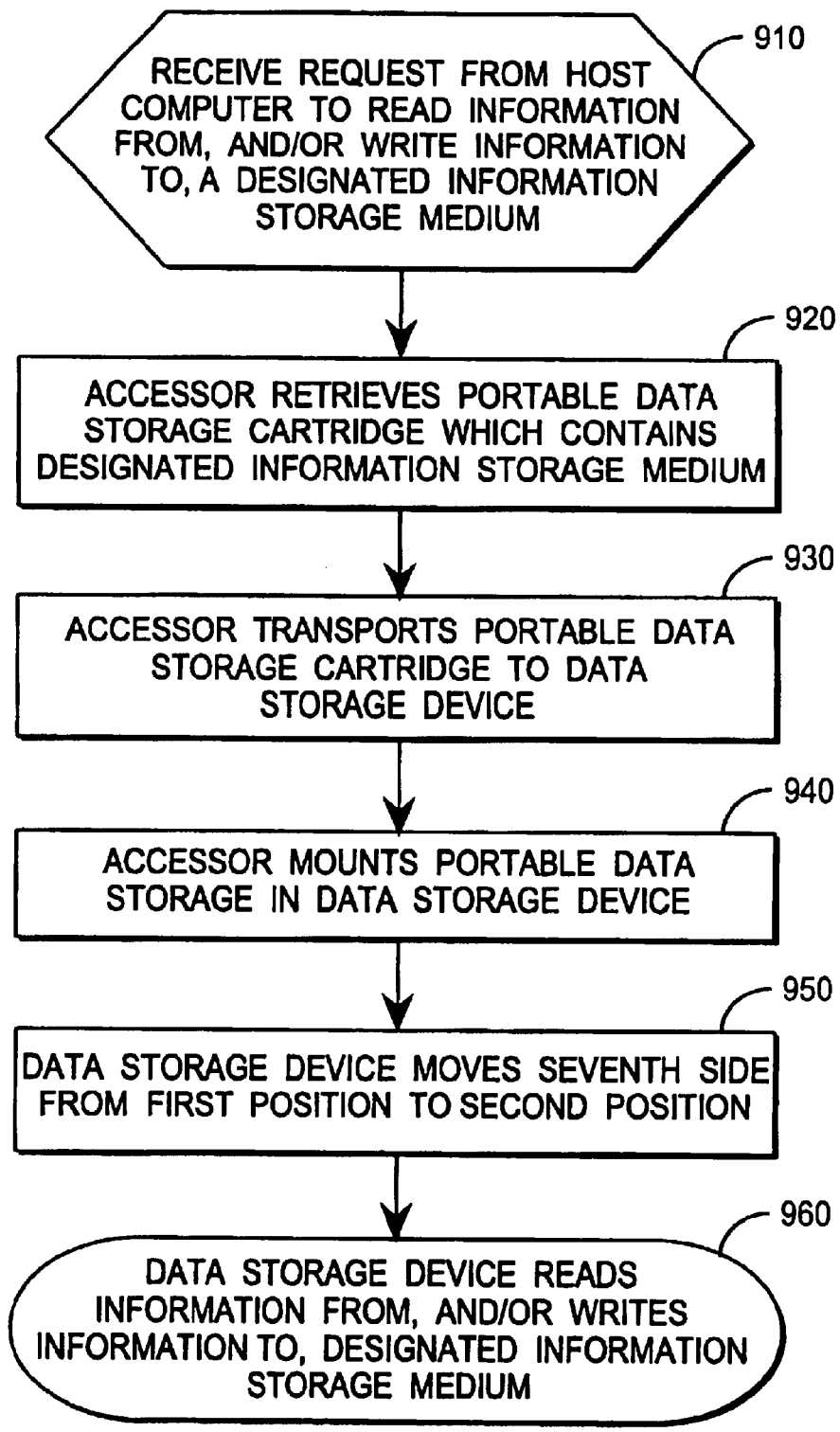
FIG. 9 summarizes the steps of Applicants' method to read information from, and/or write information to, an information storage medium disposed within Applicants' housing.

Applicants' invention includes a method to read information from, and/or write information to, an information storage medium disposed within a portable data storage cartridge comprising Applicants' housing, where that portable data storage cartridge is moveable disposed within Applicants' data storage and retrieval system, such as system 800. FIG. 9 summarizes the steps of Applicants' method.

In step 910, Applicants' data storage and retrieval system, such as system 800 (FIG. 8), receives a request from one or more host computers to read information from, and/or write information to, a designated information storage medium disposed within a portable data storage cartridge comprising Applicants' housing, such as housing 500 (FIGS. 5D, 6D). In step 920, an accessor, such accessor 810 (FIG. 8)/820 (FIG. 8), retrieves the portable data storage cartridge from a storage slot, such as a storage slot disposed in first storage wall 802 (FIG. 8)/second storage wall 804 (FIG. 8).

In step 930, the accessor transports the portable data storage cartridge to a data storage device, such as device 830 (FIG. 8)/840 (FIG. 8). In step 940, the accessor disposes, i.e. mounts, the portable data storage cartridge in the data storage device. In step 950, the data storage device moves the seventh side from the closed position shown in FIG. 5D to the open position shown in FIG. 6D. In step 960, the data storage device reads information from, and/or writes information to, the information storage medium disposed in Applicant's portable data storage cartridge.

Applicants' data storage and retrieval system includes a computer useable medium having computer readable program code disposed therein for writing information to and/or retrieving information from, an information storage medium disposed within Applicants' portable data storage cartridge.

While the preferred embodiments of the present invention have been illustrated in detail, it should be apparent that modifications and adaptations to those embodiments may occur to one skilled in the art without departing from the scope of the present invention as set forth in the following claims.

We claim:

1. A housing for an information storage medium, comprising:
    a top;
    a bottom;
    four sides, wherein said four sides in combination with said top and said bottom define an enclosed space having an opening;
    a moveable curved door slidingly disposed within said enclosed space, wherein said moveable curved door includes a first member having a first radius of curvature and a second member having a second radius of curvature, wherein said first radius of curvature differs from said second radius of curvature.

2. The housing of claim 1, wherein said moveable curved door can be slidingly moved from a first position to a second position.

3. The housing of claim 2, wherein said housing comprises a contiguous enclosure when said moveable curved door is in said first position.

4. The housing of claim 2, wherein said housing includes said opening when said moveable curved door is in said second position.

5. The housing of claim 1, wherein:
    said a first member further comprises a first end, a second end, and a first surface;
    said a second member further comprises a proximal end and a distal end, wherein said proximal end of said second member is disposed on said second end of said first member and said distal end of said second member extends outwardly from said first member;
    said moveable door further comprising a third member having a proximal end and a distal end, wherein said proximal end of said third member is disposed on said first surface of said first member.

6. The housing of claim 5, wherein said distal end of said third member extends through a first one of said four sides.

7. The housing of claim 6, wherein:
    said distal end of said third member is disposed through said first side at a first location when said moveable curved door is in said first position; and
    said distal end of said third member is disposed through said first side at a second location when said moveable curved door is in said second position.

8. The housing of claim 5, wherein said bottom comprises an interior surface, further comprising:
    a fourth member comprising a first end and a second end, wherein said second end of said fourth member includes an aperture extending therethrough;
    wherein said first end of said fourth member is disposed on said interior surface; and
    wherein said distal end of said second member is slidingly disposed through said aperture.

9. The housing of claim 8, further comprising:
    a spring disposed around said second member, wherein said spring is disposed between said second end of said first member and said fourth member.

10. The housing of claim 9, wherein said spring exerts a first force on said moveable curved door when said moveable curved door is disposed in said first position, and wherein said spring exerts a second force on said moveable curved door when said moveable curved door is disposed in said second position, wherein said second force is greater than said first force.

11. The housing of claim 8, further comprising a spring having a first end and a second end, wherein said first end of said spring is attached to said first member, and wherein said second end of said spring is attached to said interior surface.

12. The housing of claim 11, wherein said spring exerts a first force on said moveable curved door when said moveable curved door is disposed in said first position, and wherein said spring exerts a second force on said moveable curved door when said moveable curved door is disposed in said second position, wherein said second force is greater than said first force.

13. A portable data storage cartridge, comprising:
    a housing;
    an information storage medium internally disposed within said housing;
    wherein said housing comprises:
        a top;
        a bottom;
        four sides, wherein said four sides in combination with said top and said bottom define an enclosed space having an opening;
        a moveable curved door slidingly disposed within said enclosed space, wherein said moveable curved door includes a first member having a first radius of curvature and a second member having a second radius of curvature, wherein said first radius of curvature differs from said second radius of curvature.

14. The portable data storage cartridge of claim 13, wherein said moveable curved door can be slidingly moved from a first position to a second position.

15. The portable data storage cartridge of claim 14, wherein said housing comprises a contiguous enclosure when said moveable curved door is in said first position.

16. The portable data storage cartridge of claim 14, wherein said housing includes said opening when said moveable curved door is in said second position.

17. The portable data storage cartridge of claim 14,
wherein said first member further comprises a first end, a second end, and a first surface, and wherein said
second member further comprises a proximal end and a distal end, wherein said proximal end of said second member is disposed on said second end of said first member and said distal end of said second member extends outwardly from said first member;
said moveable door further comprising a third member having a proximal end and a distal end, wherein said proximal end of said third member is disposed on said first surface of said first member.

18. The portable data storage cartridge of claim 17, wherein said distal end of said third member extends through a first one of said four sides.

19. The portable data storage cartridge of claim 18, wherein:
said distal end of said third member is disposed through said first side at a first location when said moveable curved door is in said first position; and
said distal end of said third member is disposed through said first side at a second location when said moveable curved door is in said second position.

20. The portable data storage cartridge of claim 17, wherein said bottom comprises an interior surface, further comprising:
a fourth member comprising a first end and a second end, wherein said second end of said fourth member includes an aperture extending therethrough;
wherein said first end of said fourth member is disposed on said interior surface; and
wherein said distal end of said second member is slidingly disposed through said aperture.

21. The portable data storage cartridge of claim 20, further comprising a spring disposed around said second member, wherein said spring is disposed between said second end of said first member and said fourth member.

22. The portable data storage cartridge of claim 21, wherein said spring exerts a first force on said moveable curved door when said moveable curved door is disposed in said first position, and wherein said spring exerts a second force on said moveable curved door when said moveable curved door is disposed in said second position, wherein said second force is greater than said first force.

23. The portable data storage cartridge of claim 17, wherein said bottom comprises an interior surface, further comprising a spring having a first end and a second end, wherein said first end of said spring is attached to said first member, and wherein said second end of said spring is attached to said interior surface.

24. The portable data storage cartridge of claim 23, wherein said spring exerts a first force on said moveable curved door when said moveable curved door is disposed in said first position, and wherein said spring exerts a second force on said moveable curved door when said moveable curved door is disposed in said second position, wherein said second force is greater than said first force.

25. A method to access an information storage medium disposed in a housing, wherein said housing comprises:
a top;
a bottom;
four sides, wherein said four sides in combination with said top and said bottom define an enclosed space having an opening;
a moveable curved door slidingly disposed within said enclosed space, wherein said moveable curved door includes a first member having a first radius of curvature and a second member having a second radius of curvature, wherein said first radius of curvature differs from said second radius of curvature, wherein said moveable curved door can be slidingly moved from a first position to a second position;
said method comprising the steps of:
moving said moveable curved door from said first position to said second position; and
accessing said information storage medium.

26. A data storage and retrieval system, comprising:
one or more accessors moveably disposed therein;
one or more storage slots;
one or more portable data storage cartridges individually stored in said one or more storage slots;
wherein one or more of said one or more portable data storage cartridges comprise:
a housing;
an information storage medium internally disposed within said housing;
wherein said housing comprises:
a top;
a bottom;
four sides, wherein said four sides in combination with said top and said bottom define an enclosed space having an opening;
a moveable curved door slidingly disposed within said enclosed space, wherein said moveable curved door includes a first member having a first radius of curvature and a second member having a second radius of curvature, wherein said first radius of curvature differs from said second radius of curvature.

27. The data storage and retrieval system of claim 26, wherein said moveable curved door can be slidingly moved from a first position to a second position.

28. The data storage and retrieval system of claim 27, wherein said housing comprises a contiguous enclosure when said moveable curved door is disposed in said first position.

29. The data storage and retrieval system of claim 27, wherein said housing includes said opening when said moveable curved door is disposed in said second position.

30. The data storage and retrieval system of claim 26, wherein said:
first member further comprises a first end, a second end, and a first surface;
said second member further comprises a proximal end and a distal end, wherein said proximal end of said second member is disposed on said second end of said first member and said distal end of said second member extends outwardly from said first member;

said housing further comprising a third member having a proximal end and a distal end, wherein said proximal end of said third member is disposed on said first surface of said first member.

31. The data storage and retrieval system of claim 30, wherein said distal end of said third member extends through a first one of said four sides.

32. The data storage and retrieval system of claim 31, wherein:

said distal end of said third member extends through said first side at a first location when said moveable curved door is in said first position; and said distal end of said third member extends through said first side at a second location when said moveable curved door is in said second position.

33. A method to write information to, or retrieve information from, an information storage medium disposed within a portable data storage cartridge moveably disposed in a data storage and retrieval system, wherein said data storage and retrieval system further includes a data storage device;

wherein said portable data storage cartridge comprises:
a housing;
said information storage medium internally disposed within said housing;
wherein said housing comprises:
a top;
a bottom;
four sides, wherein said four sides in combination with said top and said bottom define an enclosed space having an opening;
a moveable curved door slidingly disposed within said enclosed space, wherein said moveable curved door includes a first member having a first radius of curvature and a second member having a second radius of curvature, wherein said first radius of curvature differs from said second radius of curvature, wherein said moveable curved door can be slidingly moved from a first position to a second position;
said method comprising the steps of:
retrieving said portable data storage cartridge from one of said one or more storage slots;
transporting said portable data storage cartridge to said data storage device;
disposing said portable data storage cartridge in said data storage device;
moving said moveable curved door from said first position to said second position, and
reading information from and/or writing information to, said information storage medium.

34. A data storage and retrieval system comprising a computer useable medium having computer readable program code disposed therein for writing information to and/or retrieving information from, an information storage medium disposed within a portable data storage cartridge moveably disposed in a data storage and retrieval system, wherein said data storage and retrieval system further includes a data storage device;

wherein said portable data storage cartridge comprises:
a housing;
said information storage medium internally disposed within said housing;
wherein said housing comprises:
a top;
a bottom;
four sides, wherein said four sides in combination with said top and said bottom define an enclosed space having an opening;
a moveable curved door slidingly disposed within said enclosed space, wherein said moveable curved door includes a first member having a first radius of curvature and a second member having a second radius of curvature, wherein said first radius of curvature differs from said second radius of curvature, wherein said moveable curved door can be slidingly moved from a first position to a second position;
the computer readable program code comprising a series of computer readable program steps to effect:
retrieving said portable data storage cartridge from one of said one or more storage slots;
transporting said portable data storage cartridge to said data storage device;
disposing said portable data storage cartridge in said data storage device;
moving said moveable curved door from said first position to said second position, and
reading information from and/or writing information to, said information storage medium.

* * * * *